(12) United States Patent
Lew

(10) Patent No.: US 10,348,671 B2
(45) Date of Patent: Jul. 9, 2019

(54) SYSTEM AND METHOD TO USE A MOBILE NUMBER IN CONJUNCTION WITH A NON-TELEPHONY INTERNET CONNECTED DEVICE

(71) Applicant: SALESFORCE.COM, INC., San Francisco, CA (US)

(72) Inventor: Eugene Lee Lew, Olney, MD (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 15/646,263

(22) Filed: Jul. 11, 2017

(65) Prior Publication Data

US 2018/0013715 A1    Jan. 11, 2018

Related U.S. Application Data

(60) Provisional application No. 62/360,568, filed on Jul. 11, 2016, provisional application No. 62/403,841, filed on Oct. 4, 2016.

(51) Int. Cl.

| | |
|---|---|
| *H04L 12/58* | (2006.01) |
| *H04L 29/08* | (2006.01) |
| *H04M 3/53* | (2006.01) |
| *H04M 3/42* | (2006.01) |
| *H04W 4/12* | (2009.01) |

(52) U.S. Cl.
CPC ............ *H04L 51/38* (2013.01); *H04L 51/066* (2013.01); *H04L 51/18* (2013.01); *H04L 51/32* (2013.01); *H04L 51/36* (2013.01); *H04L 67/025* (2013.01); *H04M 3/42382* (2013.01); *H04M 3/53* (2013.01); *H04M 3/5322* (2013.01); *H04W 4/12* (2013.01); *H04M 2201/40* (2013.01)

(58) Field of Classification Search
CPC ....... H04L 51/38; H04L 51/066; H04L 51/18; H04L 67/025; H04L 51/32; H04L 51/36; H04M 3/53; H04M 3/42382; H04M 3/5322; H04M 2201/40; H04W 4/12

See application file for complete search history.

(56) References Cited

U.S. PATENT DOCUMENTS

| | | |
|---|---|---|
| 6,415,250 B1 | 7/2002 | Van den Akker |
| 6,449,483 B1 | 9/2002 | Akhteruzzaman et al. |
| 6,591,103 B1 | 7/2003 | Dunn et al. |
| 6,690,932 B1 | 2/2004 | Barnier et al. |
| 6,757,365 B1 | 6/2004 | Bogard |

(Continued)

FOREIGN PATENT DOCUMENTS

| | | |
|---|---|---|
| GB | 2397730 B | 6/2006 |
| GB | 2431820 A | 5/2007 |
| WO | 2007015075 | 2/2007 |

OTHER PUBLICATIONS

European Search Report for corresponding European application No. 09805443.0, dated Dec. 11, 2013, total pp. 8.

(Continued)

*Primary Examiner* — Dinh Nguyen

(74) *Attorney, Agent, or Firm* — Morris & Kamlay LLP

(57) ABSTRACT

A system and method and enables using a mobile number in conjunction with a non-telephony internet connected device. The system also facilitates SMS communication with Internet of Things devices and SMS communication in conjunction with over-the-top (OTT) services.

12 Claims, 4 Drawing Sheets

(56) References Cited

U.S. PATENT DOCUMENTS

| | | |
|---|---|---|
| 7,002,970 B1 | 2/2006 | Veschi |
| 7,010,312 B1 | 3/2006 | Zechlin |
| 7,197,035 B2 | 3/2007 | Asano |
| 7,263,076 B1 | 8/2007 | Leibovitz et al. |
| 7,275,104 B1 | 9/2007 | Martinez et al. |
| 7,343,168 B2 | 3/2008 | Valloppillil |
| 7,380,022 B2 | 5/2008 | Tell et al. |
| 7,437,146 B2 | 10/2008 | Dudley |
| 7,446,655 B2 | 11/2008 | Jha et al. |
| 7,499,704 B1 | 3/2009 | Bonner |
| 7,564,958 B1 | 7/2009 | Contractor |
| 7,606,568 B2 | 10/2009 | Gallagher et al. |
| 7,693,535 B2 | 4/2010 | Dunko |
| 7,734,908 B1 | 6/2010 | Kung et al. |
| 7,860,525 B2 | 12/2010 | Parkkinen et al. |
| 7,865,198 B2 | 1/2011 | Shin |
| 7,940,896 B2 | 5/2011 | Prozeniuk et al. |
| 8,463,304 B2 | 6/2013 | Lauer et al. |
| 8,520,833 B1 | 8/2013 | Pettay et al. |
| 8,570,906 B1 | 10/2013 | Croak et al. |
| 8,788,599 B2 | 7/2014 | Harju et al. |
| 8,890,685 B1 | 11/2014 | Sookman et al. |
| 8,989,713 B2 | 3/2015 | Doulton |
| 9,710,982 B2 | 7/2017 | Matthews et al. |
| 2003/0101244 A1 | 5/2003 | Lockridge et al. |
| 2003/0185379 A1 | 10/2003 | O'Connor et al. |
| 2003/0232623 A1 | 12/2003 | Balasuriya et al. |
| 2004/0076144 A1 | 4/2004 | Ishodoshiro |
| 2004/0109452 A1 | 6/2004 | Takihiro et al. |
| 2004/0137923 A1 | 7/2004 | Lang |
| 2005/0032518 A1 | 2/2005 | Rajan |
| 2005/0148353 A1 | 7/2005 | Hicks et al. |
| 2005/0149335 A1 | 7/2005 | Mesbah et al. |
| 2005/0181805 A1 | 8/2005 | Gallagher |
| 2005/0233733 A1 | 10/2005 | Roudtree et al. |
| 2005/0277407 A1 | 12/2005 | Ahn et al. |
| 2005/0288045 A1 | 12/2005 | Yang et al. |
| 2006/0040606 A1 | 2/2006 | Kangas |
| 2006/0074628 A1 | 4/2006 | Elbaz et al. |
| 2006/0123360 A1 | 6/2006 | Anwar et al. |
| 2006/0142012 A1 | 6/2006 | Kirchhoff et al. |
| 2006/0148495 A1 | 7/2006 | Wilson |
| 2006/0259473 A1 | 11/2006 | Li et al. |
| 2007/0026901 A1 | 2/2007 | McKay |
| 2007/0032225 A1 | 2/2007 | Konicek et al. |
| 2007/0066318 A1 | 3/2007 | Danzeisen et al. |
| 2007/0073585 A1 | 3/2007 | Apple et al. |
| 2007/0082664 A1 | 4/2007 | Landschaft et al. |
| 2007/0167178 A1 | 7/2007 | Al-Harbi |
| 2007/0190978 A1 | 8/2007 | White et al. |
| 2007/0203850 A1* | 8/2007 | Singh .................. G06Q 20/327 705/67 |
| 2008/0032679 A1 | 2/2008 | Purontaus et al. |
| 2008/0037456 A1* | 2/2008 | Chen ................ H04L 29/06027 370/313 |
| 2008/0043969 A1 | 2/2008 | Shi |
| 2008/0045250 A1 | 2/2008 | Hwang |
| 2008/0096588 A1 | 4/2008 | Waytena et al. |
| 2008/0114862 A1 | 5/2008 | Moghaddam |
| 2008/0140850 A1 | 6/2008 | Gade et al. |
| 2008/0172496 A1 | 7/2008 | Middleton et al. |
| 2008/0182563 A1 | 7/2008 | Wugofski et al. |
| 2008/0192908 A1 | 8/2008 | OKeefe et al. |
| 2008/0198987 A1 | 8/2008 | Daly |
| 2008/0263137 A1 | 10/2008 | Pattison et al. |
| 2008/8027055 | 10/2008 | Bamford |
| 2008/0293404 A1 | 11/2008 | Scherzer et al. |
| 2009/0003312 A1 | 1/2009 | Velazquez et al. |
| 2009/0005005 A1 | 1/2009 | Forstall et al. |
| 2009/0017789 A1 | 1/2009 | Thomas et al. |
| 2009/0031232 A1 | 1/2009 | Brezina et al. |
| 2009/0154434 A1 | 6/2009 | Tanaka et al. |
| 2009/0156179 A1* | 6/2009 | Hahn .................. G06Q 10/101 455/414.1 |
| 2009/0156202 A1 | 6/2009 | Reiss et al. |
| 2009/0186634 A1 | 7/2009 | Sureka |
| 2009/0201916 A1 | 8/2009 | Caron et al. |
| 2009/0249478 A1* | 10/2009 | Rosener .................. G06F 21/31 726/19 |
| 2009/0319914 A1 | 12/2009 | Roseway et al. |
| 2010/0029273 A1 | 2/2010 | Bennett |
| 2010/0035640 A1 | 2/2010 | Lew et al. |
| 2010/0124905 A1 | 5/2010 | Pratt et al. |
| 2010/0262668 A1 | 10/2010 | Piett et al. |
| 2010/0028721 A1 | 11/2010 | Lasensky et al. |
| 2011/0045828 A1 | 2/2011 | Madan et al. |
| 2011/0070868 A1 | 3/2011 | Scholz et al. |
| 2011/0142211 A1 | 6/2011 | Maes |
| 2011/0195722 A1 | 8/2011 | Walter et al. |
| 2012/0165048 A1 | 6/2012 | Zhu |
| 2012/0221962 A1 | 8/2012 | Lew et al. |
| 2012/0226759 A1 | 9/2012 | Lee et al. |
| 2012/0288075 A1* | 11/2012 | Williams ............... G06Q 10/02 379/93.17 |
| 2013/0080898 A1* | 3/2013 | Lavian ..................... G06F 3/16 715/728 |
| 2013/0194135 A1 | 8/2013 | Farnham |
| 2013/0196697 A1 | 8/2013 | Lew et al. |
| 2013/0252649 A1 | 9/2013 | Siomina et al. |
| 2013/0298037 A1 | 11/2013 | Matthews et al. |
| 2013/0310089 A1* | 11/2013 | Gianoukos .............. H04L 51/36 455/466 |
| 2014/0106701 A1 | 4/2014 | Silver et al. |
| 2014/0179260 A1 | 6/2014 | Malin |
| 2014/0269679 A1 | 9/2014 | Gillis et al. |
| 2014/0364082 A1* | 12/2014 | Baddeley ............... H04W 40/02 455/406 |
| 2015/0149560 A1 | 5/2015 | Lee |
| 2015/0223271 A1* | 8/2015 | Penix .................. H04W 76/007 455/404.2 |
| 2015/0031956 A1 | 11/2015 | Hancock |
| 2016/0191443 A1 | 6/2016 | Dudley |
| 2016/0260025 A1 | 9/2016 | Goldberg |
| 2017/0011018 A1 | 1/2017 | Hancock |
| 2018/0007060 A1* | 1/2018 | Leblang ................ H04L 63/105 |

OTHER PUBLICATIONS

International Search Report and Written Opinion dated Dec. 7, 2011 in corresponding International Application No. PCT/US2011/037190.

Notification of Transmittal of the International Search Report and the Written Opinion of the International Searching Authority, PCT/US2016/029665, p. 12, dated Aug. 11, 2016.

International Search Report for International Application No. PCT/US2009/052715 dated Sep. 24, 2009.

International Search Report and the Written Opinion for International Application No. PCT/US2016/029667, 3 Pages, dated Aug. 5, 2016.

* cited by examiner

SYSTEM AND METHOD TO USE A MOBILE NUMBER IN CONJUNCTION WITH A NON-TELEPHONY INTERNET CONNECTED DEVICE

RELATED APPLICATIONS

This application claims the benefit of U.S. Provisional Application No. 62/360,568 filed Jul. 11, 2016, entitled SYSTEM AND METHOD TO USE A MOBILE NUMBER IN CONJUNCTION WITH A NON-TELEPHONY INTERNET CONNECTED DEVICE, and U.S. Provisional Application No. 62/403,841 filed Oct. 4, 2016, entitled OTT MESSAGING SERVICE AND SMS/MMS AGGREGATION ENGINE which applications are hereby incorporated herein by reference in their entireties.

FIELD OF THE INVENTION

The present invention relates to text messaging and using a mobile number in conjunction with a non-telephony Internet connected device and relates to communications via SMS/MMS messaging and multiple Over-The-Top (OTT) service providers.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

A person's mobile number has always been tied to their mobile phone due to mobile operator's network architecture where a subscriber identity module or subscriber identification module (SIM) card is equivalent to a mobile phone number. People would like to be 'unchained' from their mobile phone just as a person's email account can be accessed on any device that has Internet access.

Social networking and business networking influence the way people communicate. Because of the influence of social media on the way people communicate, there are many social networks being developed and used by users throughout the world. For example, Facebook®, MySpace®, Linkedin®, Google+®, Twitter®, Chatter®, WhatsApp and other social networks have been created and developed in response to the social media craze.

Conventional Customer Relations Management (CRM) systems generally provide a web-based customer communications between users and customers. Enterprises have long had to deal with different ways that its customers communicate with them (e.g., paper, voice, fax, email, IM, etc.) and could never really realize a process to collect and collate all of the communications channels' data into the enterprise CRM system. Voice communication is a particularly difficult form of communication to integrate within the CRM system and the introduction of Internet Protocol (IP) and mobile messaging services including SMS/MMS text messaging, and proprietary systems such as Facebook, WhatsApp, WeChat, etc., only compound the problem.

Enterprises have long had to deal with different ways that its customers communicate with them (e.g.—paper, voice, fax, email, IM, etc.) and could never really realize a way to collect and collate all of the communications channels' data into its CRM system. Voice communications and the introduction of IP and mobile messaging services from SMS/MMS to proprietary systems such as Facebook, WhatsApp, WeChat, etc., only compound the integration problem.

Previous attempts have only addressed a single communications channel such as voice only, email only, fax only, paper only, etc. The same challenges exist with a multitude of proprietary OTT services (Facebook, Instant Messenger, Viber, WeChat, etc.) as well as hybrid SS7/IP based SMS/MMS platforms. There appears to be a shift towards mobile messaging communication. Because of this shift toward mobile communications that is not primarily voice based, enterprise based CRM systems will require the ability to collect and collate all its users' and customers' mobile messaging communications in addition to email, IM and other IP based communications.

SUMMARY OF THE INVENTION

Embodiments disclosed herein facilitate using a mobile number in conjunction with a non-telephony internet connected device. In one embodiment, a computer-implemented method for using a mobile number in conjunction with a non-telephony Internet connected device includes authenticating the Internet connected device, receiving a command originating from the Internet connected device and having a destination address, associating the Internet connected device with the mobile number, retrieving the mobile number associated with the Internet connected device, changing the origin of the command to the mobile number and processing the command to deliver data to the destination. Such a technique enables users of mobile phones to use their mobile phone number on other devices that they own. This technique: enables a person to utilize a resource (phone number) that they pay for and use, on other devices; frees them from being physically required to send SMS/MMS messages from their mobile phone; and maintains primary communications on the mobile phone but allows use of the mobile identifier on other devices while maintaining integrity of the person (validation of actual ownership of the mobile number.

In another embodiment, the command is a request to send an SMS/MMS/EMS message and the data includes an SMS/MMS/EMS message to be delivered to the destination. In yet another embodiment, the command is a command to Internet of things device and the data identifies the command and a response to the command can be generated by the Internet of things device and directed back to the mobile number. In another embodiment, the method further includes providing a messaging connection between an Over-The-Top (OTT) service and a non-telephony Internet connected device.

In a further embodiment, authenticating the Internet connected device includes receiving a PIN request originating from the Internet connected device including the mobile number, sending an SMS message including a unique PIN number to the mobile number and storing an association between the Internet connected device and the mobile number.

Embodiments disclosed herein enable users (through cooperating service providers) to use their mobile number on other devices without having the mobile operators changing their network architecture/design (e.g., SIM cards and supporting infrastructure).

Other embodiments of the invention that are disclosed herein include software programs to perform the steps and operations summarized above and disclosed in detail below. One such embodiment comprises a computer program product that has a non-transitory computer readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include web applications, browsers, IP applications and data enabled device applications as will be explained in more detail.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein

DETAILED DESCRIPTION

Figure 1:
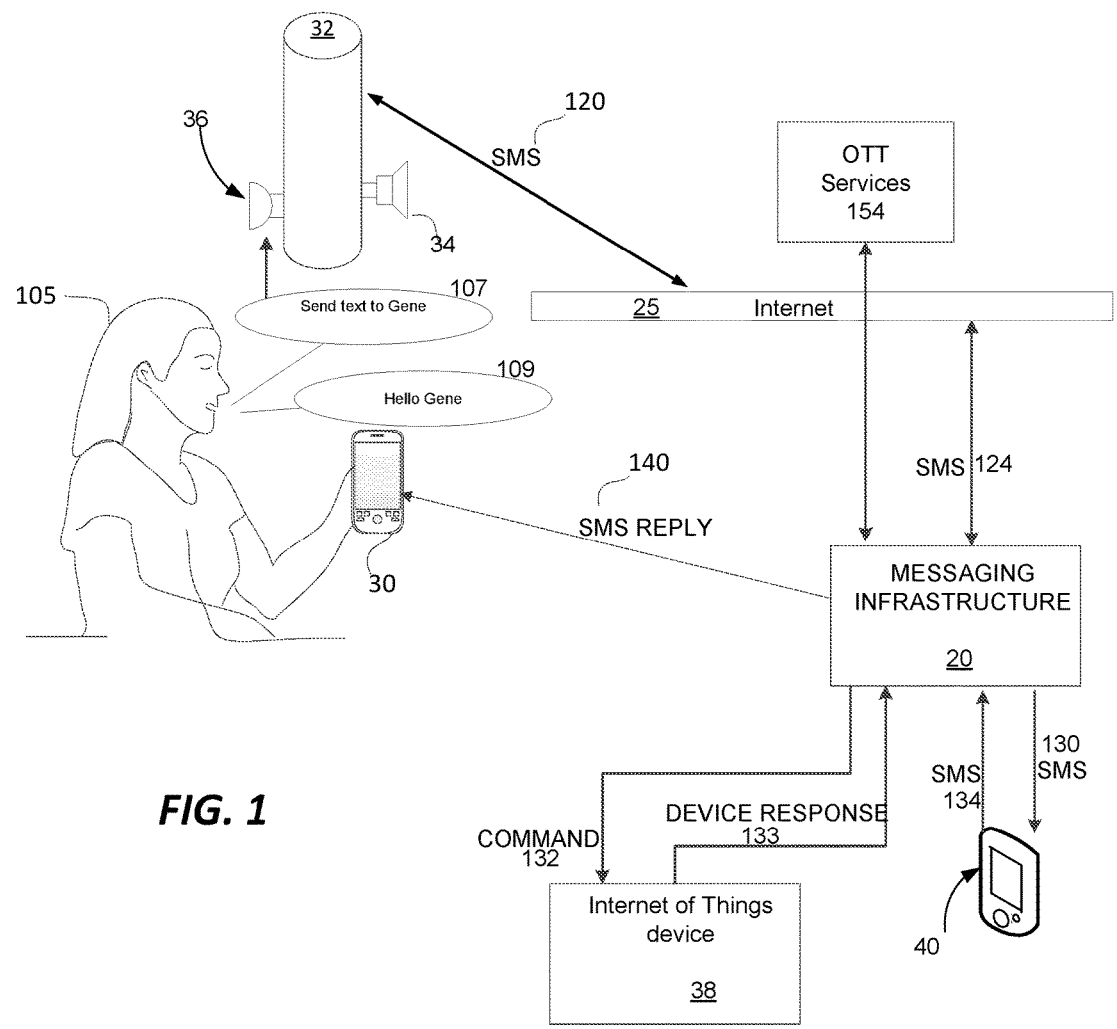
FIG. 1 is a schematic illustration of a user sending a text message to another party using a non-telephony Internet connected device using a mobile number and receiving a reply on the mobile phone in accordance with embodiments disclosed herein.

In an exemplary embodiment, a service enables a person to use their mobile phone number on other devices. Now referring to FIG. 1, an exemplary transaction is shown. Here, Joann has a +44 7 1234-5678 mobile number on her Vodafone mobile phone 30. Joann has several other IP connected devices (laptop, home cordless phone system, portable music player, intelligent communications devices, etc.). Here an intelligent communications device 32 (also referred to as internet connect device 32, device 32, IP connected device 32 and smart home speaker 32) is able to accept voice commands via microphone 36, and includes a speaker 34 but does not have a keyboard or a display device (e.g., voice-activated smart home speakers such as an Amazon Echo device, Google Home device or Apple HomePod device.) Device 32 is connected to the Internet 25. Here, the user 105 Joann speaks a command 107 to send a text message to Gene (not shown). Next Joann speaks the contents of the text message 109. The command and the texts are recognized the device 32. Device 32 then sends the command and text, in one embodiment as an SMS message 120 through the Internet as SMS message 124 to the messaging infrastructure 20. It is understood that the message and/or command can be sent in various way to the messaging infrastructure 20, for example, as an SMS message or a command and data.

In this example Joann 'sends' an SMS/MMS using her +44 7 1234-5678 mobile number to Gene by using her voice-activated smart home speaker. She could also use a home cordless phone system which has an IP connection.

The command and data (here a text message) is processed through the messaging infrastructure 20 and Gene receives Joann's SMS/MMS message 130 on his mobile phone 40. The SMS/MMS message 130 shows the 'origin' as +44 7 1234-5678 (Joann's phone).

Gene replies to Joann's message 130, and the reply SMS message 134 is delivered through the messaging infrastructure 20 and Gene's reply message 140 is delivered to: +44 7 1234-5678 which is Joann's mobile phone.

It is also possible to send other commands and data to devices connected to the messaging infrastructure which would normally respond to commands from authenticated mobiles phones. In this manner, device 32 could control an Internet of Things device 38 with a command 132 delivered from device 32 but appearing to come from mobile phone 30. Responses 133 from the Internet of Things device 38 can be returned as an SMS reply message 140. In this embodiment, the command is a command to an Internet of things device and the data identifies the command. The Internet of Things device 38 can generate a response which is directed back to the mobile number and then delivered to mobile phone 30. If the Internet of Things device 38 is provisioned to send SMS messages the response can be an SMS message otherwise an IP message can be converted to an SMS message and sent to the mobile number. The SMS conversion can be accomplished within messaging infrastructure 20 or by an external device (not shown) in communication with the Internet of Things device 38.

Services provided by the messaging infrastructure 20 can also establish secure connections (either directly or indirectly through APIs) to various OTT Service provider services 154. These services identify telephone numbers, IP address, MAC addresses, and other identification along with authentication information for various OTT services used.

Figure 2:
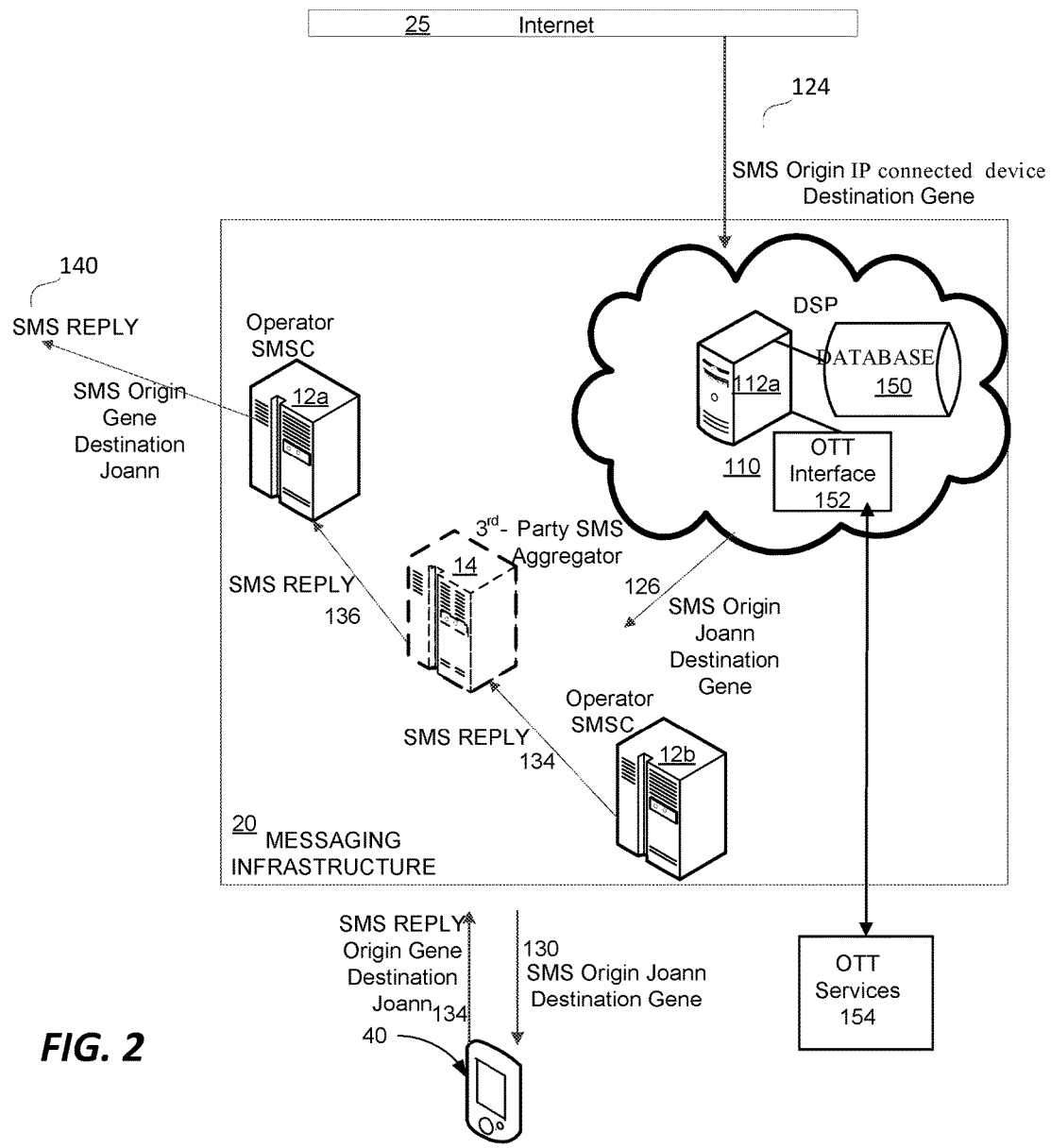
FIG. 2 illustrates details of the messaging infrastructure of FIG. 1 including details of the device service provider (DSP)

Now referring to FIG. 2, further details of the messaging infrastructure 20 are shown. FIG. 2 illustrates how the device Service Provider DSP 110 facilitates the use of a mobile number as the origin phone number as follows:

In one embodiment, the device Service Provider utilizes a ShortCode or other bulk sending mechanism to handle a portion of the transaction to verify ownership of the origin phone number;

The 'origin' identifier is altered to utilize a mobile number, typically at one of the SMS message processing servers prior to sending to mobile ecosystem for delivery (e.g., operator/carrier SMSC/MMSC 12a-12b, third party aggregators 14, web servers, etc.).

The DSP 110 maintains a database 150 record of its customer for the device/account/service) associating the "verified" (thru an authorization PIN SMS sent to the mobile number with a PIN code described below in conjunction with FIG. 3) so that any future SMS messages from the customer on the device/service get associated with the mobile number so for example responses are directed back to an actual mobile phone instead of the internet connected device 32.

The DSP 110 database 150 record of the customer and his associated mobile number is also updatable to be changed by the customer when switching to a new mobile number or removing a mobile number. The DSP 110 can include an OTT Interface 152 which communicates with various OTT services 154 to providing a messaging connection between an OTT service and a non-telephony Internet connected device.

Figure 3:
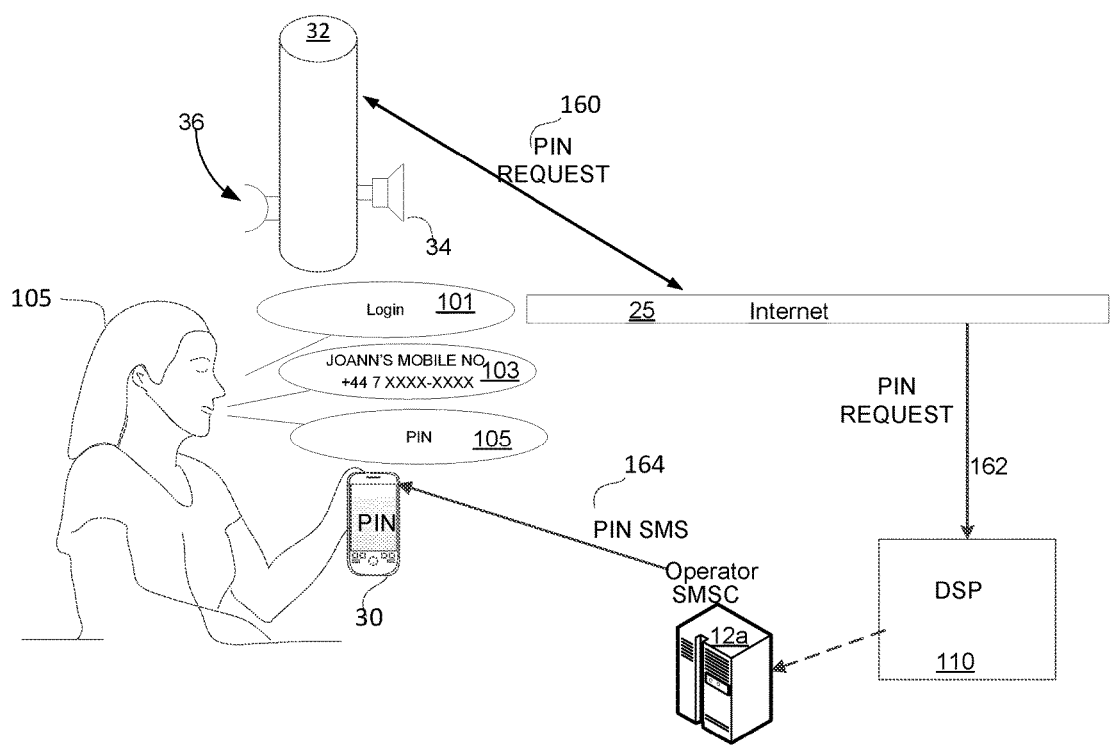
FIG. 3 illustrates details of an embodiment of the messaging hub of FIG. 1 including details of a follow on P2P conversation after a diverting a reply to an A2P message from a customer.
Figure 4:
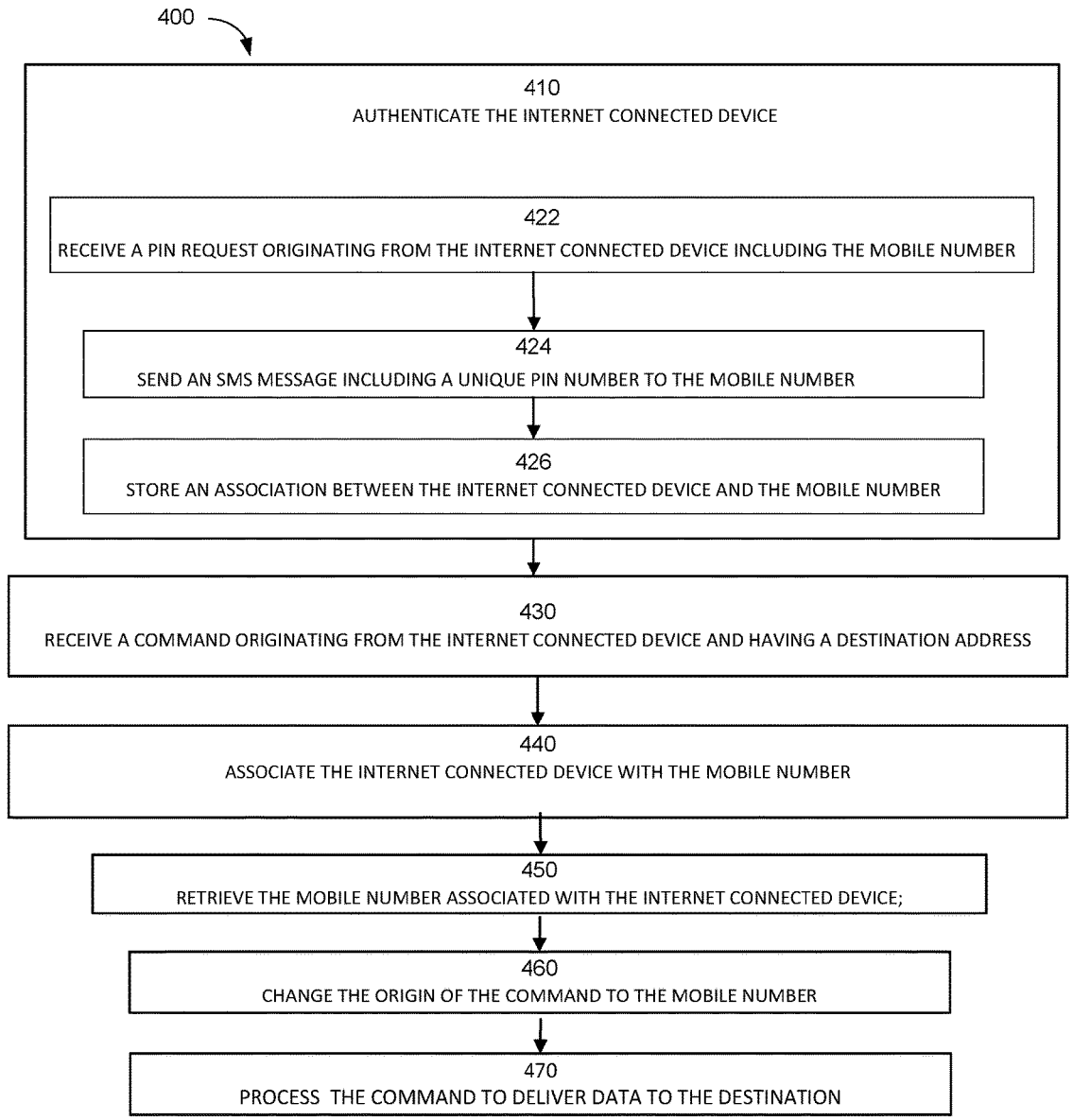
FIG. 4 is a flow chart of processing steps performed for facilitating the operations of FIGS. 1-3.

Now referring to FIG. 3, further details of the authentication process are shown. Here a pin request 160 and a PIN response are used to authenticate the IP connected device 32. An exemplary authentication transaction proceeds as follows:

Joann logs onto IP connected device 32 via a voice command 101;

Device 32 has a function to allow Joann to use her mobile number for sending SMS/MMS messages and Joann initiates the function with voice command 103;

Joann inputs her mobile number, +44 7 xxxx-xxxx, to the device via voice response 105;

The device 32 service provider, ACME Corp., receives a pin request 160 and sends an authentication/verification PIN via SMS 164 to Joann's inputted mobile number, +44 7 xxxx-xxxx, to verify Joann really owns and has control of the mobile number, with a randomly generated PIN code;

The device requires input of the just delivered PIN code to 'prove' Joann is the owner/user of the mobile number and Joann inputs the PIN via voice command 105;

Upon verification, which can be handled several ways, for example, using the PIN in every transaction, verifying a MAC address/IP address or using another encryption/verification process whenever Joann sends an SMS/MMS message or other command from the device, the device's Service Provider will utilize Joann's mobile number as the 'origin' phone number in the SMS/MMS message field In FIG. 4, flowchart 400 diagrams the overall process of using a mobile number in conjunction with a non-telephony Internet connected device. In step 410, the Internet connected device is authenticated. As part of the authentication process in step 422, a PIN request originating from the Internet connected device including the mobile number is received by the DSP 110. The request is submitted by a user, for example, by using a voice-activated smart home speaker 32.

In one embodiment, a non-telephony device (e.g.—Amazon Echo, Google Home, etc.) which has no telephone connection and thus, no assigned telephone number, can assume the identity of a telephone number by requesting authorization to xxx-xxx-xxxx. For example:

Amazon Echo wants to send/receive messages using +1 617 123-4567;

Amazon Echo sends out request via IP to web service handling SMS/MMS/EMS for +1 617 123-4567;

The (telephone company) Telco owner/DSP/Mobile virtual network operators (MVNO) of +1 617 123-4567 sends an SMS/MMS/EMS to the telephony device associated with this number (e.g., a mobile phone) with a PIN code or some other randomly generated authorization code;

the user of the Amazon Echo enters the PIN code via some user interface (which could be voice as well) which acknowledges the IP device as authorized to represent +1 617 123-4567;

the Telco owner/DSP/MVNO of +1 617 123-4567 could send out the PIN/Auth code via a ShortCode, a standard telephone number if SMS/MMS is enabled for that telephone number or via some private secure authenticated IP channel to the mobile device so that the Telco owner/DSP/MVNO knows that the is the actual owner of +1 617 123-4567.

Next in step 424, an SMS message including a unique PIN number to the mobile number is sent from the DSP 110 to the user's mobile phone. Finally the authentication process is finished by storing an association between the Internet connected device and the mobile number in step 426.

In step 430, a command originating from the Internet connected device and having a destination address is received by the DSP 110. In step 440, the Internet connected device is associated with the mobile number. In step 450, the mobile number associated with the Internet connected device is retrieved. It is understood that there are several ways to perform the association and retrieval since it could be accomplished in the device 32 or the DSP 110.

In step 460, the origin of the command is changed to the mobile number. The process can also be performed in several places. After this step, when the command or SMS message is delivered it will appear as if the command or SMS message originated from the mobile phone associated with the origin. Finally the command is process in Step 470 to deliver data to the destination. This can result in a text message being sent through an aggregator 14 or directly to a carrier/operator SMSC 12 and eventually to a mobile phone. In the case of an Internet of Things device 38, the command/data or SMS message can be delivered from a carrier or through the Internet.

Although the example and embodiments are described above with respect to SMS/MMS messaging, the present invention is not limited to SMS/MMS messaging. The methods disclosed herein can apply to other messaging environments as well as mixture of SMS/MMS with other messaging environments.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

What is claimed is:

1. A computer-implemented method for using a user mobile number in conjunction with a non-telephony Internet connected device, the method comprising:

authenticating the non-telephony Internet connected device;

receiving a command and data, the command and the data having an origin identifier of the non-telephony Internet connected device;
        wherein the command and the data are directed to be delivered to a destination which is one of:
            a third party phone; and
            an Internet of things device;
        wherein at least one of the command and the data includes a destination address of the destination;
        wherein the command and the data are sent over an Internet connection from the non-telephony Internet connected device;

associating the non-telephony Internet connected device with the user mobile number;

retrieving the user mobile number associated with the non-telephony Internet connected device;

altering the origin identifier of the command from the non-telephony Internet connected device to the user mobile number;

processing the command to deliver the data to the destination such that, at the destination, the data appear to come from a mobile phone having the user mobile number rather than from the non-telephony Internet connected device;

receiving a response to the command from the one of the third party phone and the Internet of things device; and directing the response back to the mobile phone having the user mobile number.

2. The method of claim 1, wherein the command is a request to send a Short Message Service/Multimedia Messaging Service/Enhanced Messaging Service (SMS/MMS/EMS) message and the data include the SMS/MMS/EMS message to be delivered to the destination; and the method further comprises sending the message from a device service provider (DSP) instead of a telephony device.

3. The method of claim 1, wherein the command is a command to the Internet of things device and the data identify the command.

4. The method of claim 1, further comprising providing a messaging connection between an Over-The-Top (OTT) service and the non-telephony Internet connected device.

5. The method of claim 1, wherein the authenticating the non-telephony Internet connected device comprises:

receiving a Personal Identification Number (PIN) request originating from the non-telephony Internet connected device including the user mobile number;

sending a message including a unique PIN number to the user mobile number; and storing an association between the non-telephony Internet connected device and the user mobile number.

6. The method of claim 5, wherein the sending the message comprises one of:

sending a Short Message Service (SMS) message including the unique PIN;

sending the unique PIN via a ShortCode;

sending the unique PIN via a standard telephone number if SMS/MMS is enabled for the standard telephone number; and sending the unique PIN to the mobile phone via a private authenticated secure IP channel.

7. The method of claim 5, wherein the authenticating the non-telephony Internet connected device further comprises receiving the user mobile number via a voice command directed to the non-telephony Internet connected device.

8. The method of claim 5, wherein the authenticating the non-telephony Internet connected device further comprises receiving the unique PIN via a voice command directed to the authenticated non-telephony Internet connected device.

9. The method of claim 1, wherein the non-telephony Internet connected device has no local connection to the mobile phone.

10. The method of claim 1, wherein the command is delivered to a device service provider (DSP) through the Internet.

11. A non-transitory computer storage medium, comprising executable instructions, which when executed by a computer, cause the computer to:

authenticate a non-telephony Internet connected device;

receive a command, the command having an origin identifier of the non-telephony Internet connected device and having a destination address, the command sent over an Internet connection;

associate the non-telephony Internet connected device with a user mobile number;

retrieve the user mobile number associated with the non-telephony Internet connected device;

alter the origin identifier of the origin of the command from the non-telephony Internet connected device to the user mobile number;

process the command to deliver data to a destination having the destination address such that, at the destination, the data appear to come from a device associated with the user mobile number rather than from the non-telephony Internet connected device;

wherein the destination is one of:
  a third party phone; and
  an Internet of things device;

receive a response to the command from the one of the third party phone and the Internet of things device; and direct the response back to the device associated with the user mobile number.

12. A computer-implemented method for using a user mobile number in conjunction with a non-telephony Internet connected device, the method comprising:

authenticating the non-telephony Internet connected device;

receiving a command and data, the command and the data having an origin identifier of the non-telephony Internet connected device;

wherein the command and the data are directed to be delivered to a destination which is one of:
  a third party phone; and
  an Internet of things device;

wherein at least one of the command and the data include a destination address of the destination;

wherein the command and the data are sent over an Internet connection;

wherein the command is a request to send a Short Message Service/Multimedia Messaging Service/Enhanced Messaging Service (SMS/MMS/EMS) message and the data include the SMS/MMS/EMS message to be delivered to the destination;

associating the non-telephony Internet connected device with the user mobile number;

retrieving the user mobile number associated with the non-telephony Internet connected device;

altering the origin identifier of the command from the non-telephony Internet connected device to the user mobile number; and processing the command to deliver the SMS/MMS/EMS message to the destination such that, at the destination, the data appear to come from a mobile phone having the user mobile number rather than from the non-telephony Internet connected device;

securely connecting to one of:
  an SMS/MMS/EMS aggregator; and
  a carrier SMSC;

sending the SMS/MMS/EMS message via an SMS messaging infrastructure;

receiving a response to the command from the one of the third party phone and the Internet of things device; and directing the response back to the mobile phone having the user mobile number.

* * * * *